June 24, 1941.    C. G. BORDEAUX ET AL    2,246,777
ELECTRIC MOTOR
Filed Sept. 17, 1938    2 Sheets-Sheet 1

INVENTORS:
Claude G. Bordeaux
Forrest S. White
by Dawn L. Wood
ATTORNEY

June 24, 1941.  C. G. BORDEAUX ET AL  2,246,777
ELECTRIC MOTOR
Filed Sept. 17, 1938   2 Sheets-Sheet 2

INVENTORS:
Claude G. Bordeaux
Forrest S. White
by Daniel L. Wood
ATTORNEY

Patented June 24, 1941

2,246,777

UNITED STATES PATENT OFFICE 2,246,777

ELECTRIC MOTOR

Claude G. Bordeaux, Albany, and Forrest S. White, Hoosick Falls, N. Y.

Application September 17, 1938, Serial No. 230,516

9 Claims. (Cl. 172—36)

Our invention more particularly relates to a combined pump and electric motor in which means are mounted on the shaft of the motor for forcing liquid through the motor and a casing combined with the motor. The foregoing construction is broadly old. In such constructions, however, the difficulty is present that the field of the motor acts as a magnet which attracts iron rust and other particles of magnetic material which may be present in fluids and particularly in city water and which are deposited between the rotor and stator and create a grinding action which injures and may eventually destroy adjacent portions of the rotor and stator.

One of the objects of our invention is the provision of practicable means for preventing particles of magnetic material which may be present in the fluid which is being forced through the motor from being deposited between the rotor and the adjacent portion of the stator.

A further object of our invention is the provision of a thin diaphragm formed of non-magnetic material disposed between the rotor and the stator together with strengthening rings secured to the diaphragm beyond the region of the gap between the field and the armature of the motor and which prevents deformation of the diaphragm, the diaphragm forming a portion of the passage for conducting liquid through the motor.

A further object of our invention is the provision of a protective shell enclosing the rotor and which is formed of bronze or other non-corrosive material and which prevents rusting of the laminations of the rotor and the consequent deposition of rusty material between the rotor and the diaphragm above referred to and which would interfere with and eventually prevent the operation of the motor.

A still further object of our invention is the provision of means mounted on the shaft of the motor which creates an upward thrust on the shaft and relieves the bearing at the end of the shaft of the wear resulting from the weight of the shaft and associated parts.

Other objects of our invention will appear in the specification and the novel features thereof will be particularly pointed out in the claims.

Our invention will best be understood by reference to the accompanying drawings in which—

Like reference characters indicate like parts throughout the drawings.

Figure 1:
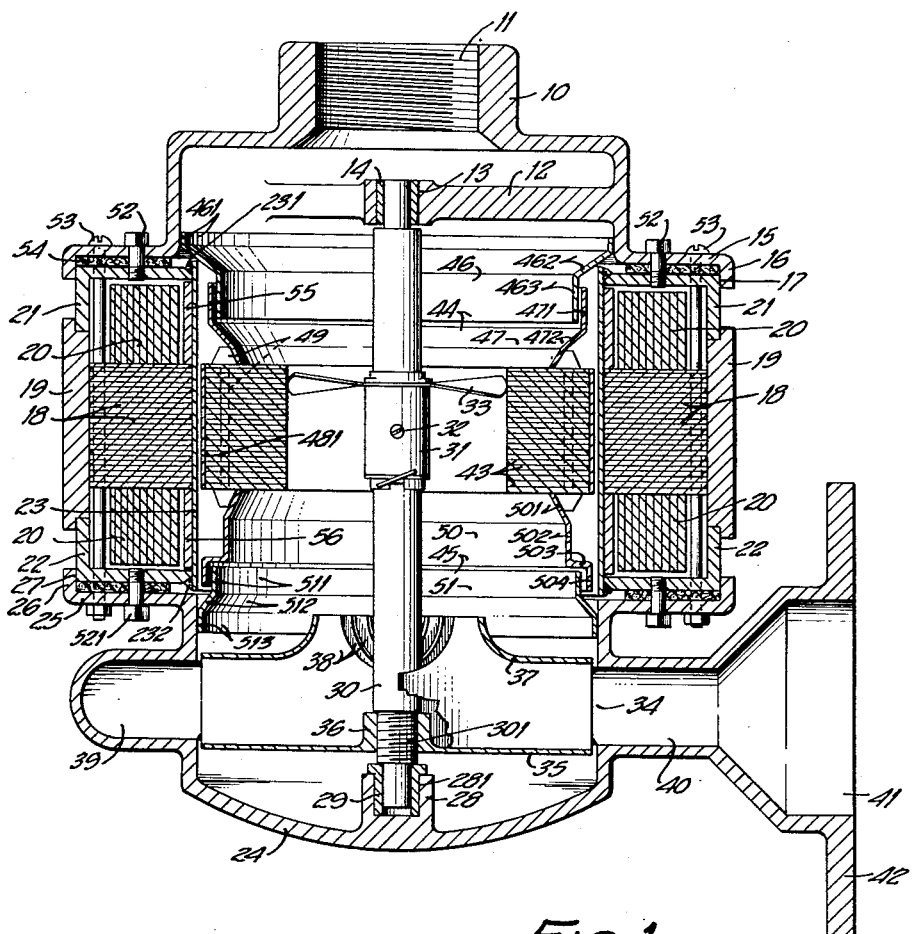
Fig. 1 is a vertical section through a combined pump and electric motor embodying our invention.

Referring to the drawings, 10 is an upper end frame or casting for the motor which is provided with an inlet opening 11 for the fluid which is being pumped. While our invention is particularly applicable to water circulators, it is to be understood that it is not limited thereto as it may be used for pumping oil and other liquids. The frame 10 is provided with an inwardly extending spider 12 provided with an opening 13 which is advantageously lined with a bearing sleeve 14. The upper end frame 10 comprises a lower horizontally extending flange 15 and an outer vertically extending flange 16 provided with a surface 17 ground to a center.

We have illustrated a squirrel cage type of induction motor, which is well suited for the purposes of our invention, although it is to be understood that our invention is not necessarily limited to a motor of this particular type. The laminations 18 for the field of the motor are forced into position within a metal ring 19 in the manner well known in a standard motor of the general type illustrated herein and the armature windings 20 are wound in the usual manner.

The field of the motor is enclosed in a casing comprising the ring 19 and upper and lower angle rings 21 and 22, respectively, and a diaphragm 23 formed of non-magnetic material, such as brass, which is interposed between the rotor and the stator. The lower end frame 24 of the unit is likewise provided at its upper portion with an outwardly extending horizontal flange 25 which is, in turn, provided with an upwardly extending flange 26, the inner surface 27 of which is ground to a true center. The lower portion of the end frame 24 is provided with an upwardly extending hub 28, provided with a recess 281 preferably lined with a bearing element 29 in which the lower end of the motor shaft 30 is received. In the embodiment of our invention illustrated, the motor shaft is provided with a sleeve 31 secured to the shaft as by a set screw 32 and which is provided with outwardly extending propeller blades 33 which force the liquid downwardly through the motor thereby creating an upward thrust on the shaft, it being understood that the propellers are designed to create an upward thrust about sufficient to neutralize the weight of the shaft whereby the lower bearing of the shaft is relieved of the downward thrust which would otherwise be present and wear the bearing. The diaphragm 23 is soldered as at 231 or otherwise sealed against the inner edge of the upper angle ring 21 and at its lower end as at 232 to the inner edge of the lower angle ring 22, the diaphragm with the end frames 10 and 24 thus forming a passage for the flow of water or other liquid through the motor.

Secured to the lower end of the shaft 30 is an impeller element indicated generally at 34 forming a part of a centrifugal pump and comprising a lower shroud 35 provided with a central hub 36 having a threaded opening in which the lower threaded portion 301 of the shaft is received. The impeller unit also comprises an upper shroud 37, impeller vanes 38 being suitably secured as by welding between the lower and upper shrouds 35 and 37.

The lower end frame 24 is formed with a volute 39 into which the water or other liquid is forced by the impeller vanes 38 and from which it flows outwardly through a passage 40 into an outlet passage 41, the outlet for the pump preferably being provided with a flange 42 which may be suitably attached to an element forming a part of the circulating system. The outer ends of the propeller blades 33 are welded or otherwise secured to the laminations 43 forming a part of the rotor.

In accordance with our invention, means which are here illustrated as overlapping upper and lower baffles indicated generally at 44 and 45, respectively, are provided for preventing the deposit of magnetic material which may be carried by the pumped liquid, and which is particularly liable to be present in city water, from being deposited between the rotor and the adjacent element of the stator and which would create a grinding action which would impair and eventually even destroy the diaphragm 23 and the adjacent portion of the rotor.

In the embodiment of our invention illustrated in Fig. 1, the upper baffle 44 comprises a stationary baffle ring 46 preferably formed with an upper vertically disposed cylindrical section 461 which is welded or otherwise secured to the upper end frame 10, an inwardly and downwardly inclined central portion 462 and a cylindrical portion 463 which is disposed within and overlaps a rotatable baffle ring 47 having a vertically disposed cylindrical portion 471 and a downwardly and inwardly inclined portion 472. The laminations 43 of the armature may conveniently be secured together by bolts 49, the lower heads of which are preferably inclined at the same angle as the inclined portion 501 of the baffle element 45 of the lower baffle element and the baffle elements may conveniently be welded or otherwise secured to the respective heads and thus caused to rotate with the rotor of the motor.

The laminations 18, due to the current in the field coils 20, act as poles the magnetic field of which is much more intense at points near the poles than at points more remote therefrom. As the rotatable baffle element 47 is disposed nearer the pole formed at the inner side of the stator field than the upper baffle element 46, deposit takes place principally upon the rotatable baffle 47. In order that any deposit on the upper baffle 44 should reach the space between the rotor and the diaphragm 23, it would be compelled to travel upwardly between the cylindrical portions 471 and 463 of the baffle elements 47 and 46, respectively. To do so, however, the deposit would be compelled to travel from the magnetic field of greater intensity to the field of less intensity which is impossible. In other words the very force that would produce the deleterious deposit between the rotor and the diaphragm is utilized in connection with the baffle for preventing such deposit taking place.

In the embodiment of our invention illustrated in Fig. 1, the laminations 43 are closely surrounded by a sleeve 481 formed of non-corrosive material such as bronze, or a metal sleeve provided with a coating of non-corrosive material, the sleeve serving to prevent the formation of rust between the periphery of the laminations and the diaphragm and which would produce a grinding action and might even prevent movement of the rotor.

The lower baffle, indicated generally at 45, is arranged in the same general manner as the upper baffle 44, the upper section 50 of the baffle having an inclined upper portion 501, a vertically disposed intermediate cylindrical portion 502, an outwardly extending horizontal flange 503 and a downwardly extending cylindrical flange 504. The lower element 51 of the lower baffle has an upper vertically disposed cylindrical portion 511, an intermediate inclined portion 512 and a lower cylindrical portion 513 which may conveniently be welded or otherwise secured to the lower end frame 24.

The lower baffle 45 also utilizes the magnetic force exerted by the field of the stator to prevent any deposit of magnetic particles from finding their way to the space between the rotor and the diaphragm 23 and for reasons presented in connection with baffle 440. In the case of the lower baffle, the principal deposit takes place on the rotatable element 50 of the baffle. In order that any deposit passing through the baffle 45 should reach the space between the rotor and the diaphragm, it would have to pass downwardly between the cylindrical portion 504 of the rotatable baffle element 50 and the cylindrical portion 511 of the baffle element 51, but in doing so it would necessarily move from the magnetic field of comparatively high intensity to a field of comparatively low intensity, which again is impossible, the lower baffle 45, thus acting in the same manner as the baffle 44 in excluding any deposit which may take place on the lower baffle from reaching the space between the rotor and the diaphragm 23.

The angular ring 21 may conveniently be secured to the horizontal flange 15 of the upper end frame 10 by bolts 52 while the lower ring 22 may conveniently be secured to the flange 25 of the lower end frame 24 by similar bolts 521.

The upper end frame 10 and lower end frame 24 are secured to the intermediate portion of the unit by bolts 53. Four of each of the bolts 52 and 521 may be conveniently used and similarly there may be four of the bolts 53 although it will, of course, be understood that any desired number of such bolts may be used.

The unit embodying our invention as illustrated in Fig. 1 may be assembled as follows. The field and associated parts may be assembled by compressing the laminations 18 within the ring 19 in a manner well known in a motor of the general type here shown. Diaphragm 23 is then positioned within the laminations 18 and the strengthening rings 55 and 56 placed in position over the ends of the diaphragm. Angle rings 21 and 22 are then placed in position in the recesses at the ends of the ring 19 and the parts forced home by bolts 53 (or other suitable bolts) passing through openings in the horizontal flanges of rings 21 and 22. The baffle elements 46 and 51 are welded or otherwise secured to the respective end frames 10 and 24 and the armature secured to the ends of the blades 33 and the baffle elements 47 and 51 welded or otherwise secured to the rotor in the manner heretofore described, the lower end of the shaft 30 is positioned in the bearing in the lower end frame which is then lifted against the angle ring 22, the upper end of the shaft being received in its bearing in the upper end frame, suitable gaskets being first interposed between the rings 21 and 22 and the end frames. The parts are then secured together by bolts 52 and 53.

The operation of the device illustrated in Fig. 1 is as follows. When the motor is energized the armature of the motor rotates thereby rotating the shaft through the connection made by the blades 33 with the rotor of the motor and the blades assist in pumping liquid through the motor and through the circulator when our invention is applied to a device of this character. At the same time the rotation of the shaft rotates the impeller vanes 38 and forces the water or other liquid outwardly into the volute 39 of the pump, it being understood that the centrifugal pump may be of standard construction. The water may be circulated to any suitable device and returned to the pump.

The diaphragm 23 which may have a thickness of eight thousandths of an inch, it being understood that our invention is not limited to these dimensions, is subjected to considerable pressure and would be liable to collapse under the liquid pressure to which it is subjected at its unsupported portions outside of the field laminations. This difficulty is overcome by surrounding the upper and lower portions of the diaphragm with the strengthening rings 55 and 56, respectively, which immediately surround the diaphragm 23.

By the described assembly of parts, we are enabled to use a diaphragm 23 of non-magnetic material which is very thin, so thin in fact that the air gap between the field of the motor and its armature is not substantially greater than the air gap of a standard motor of the type illustrated and the efficiency is very nearly as high as that of a standard motor of the same type. The slight loss of efficiency is not appreciable and any such slight loss is very greatly overbalanced by the advantages derived from the combined motor and pump illustrated. In the drawings we have exaggerated the distance between the baffle elements of a given baffle the better to illustrate our invention. It will be understood, however, that such elements closely surround each other.

Figure 2:
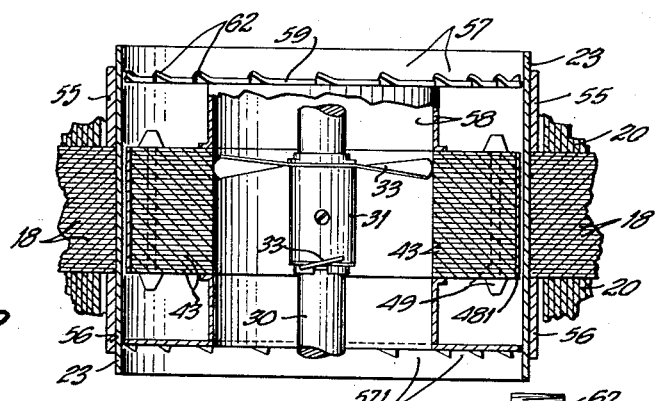
Fig. 2 is a fragmentary vertical section through a combined pump and motor and illustrating a modified form of device for preventing particles of magnetic material, which may be carried by the pumped fluid, from being deposited between the rotor and the adjacent portion of the stator.
Figure 3:
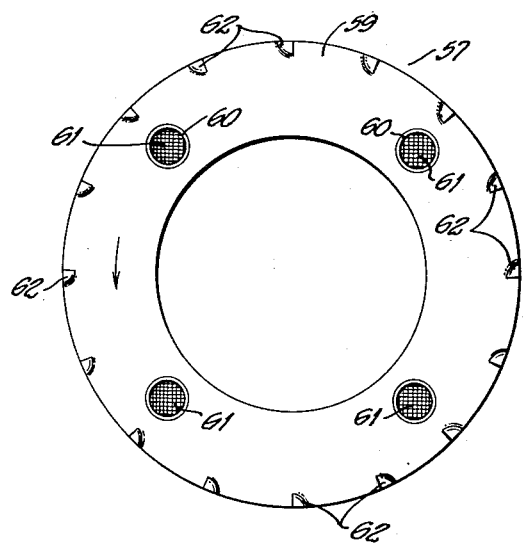
Fig. 3 is a plan view, with certain parts omitted, of Fig. 2.

In Figs. 2 and 3 we have illustrated a modification of our invention in which any deposit of magnetic particles which may be carried by the liquid passed through the motor is prevented from deposition between the rotor and the diaphragm 23 by the provision of an upper rotatable element indicated generally at 57. This element comprises a tubular cylindrical element 58 which is secured to the armature of the rotor and provided at its upper end with an outwardly extending circular plate 59 the outer edge of which is closely surrounded by the diaphragm 23 and which is provided with a plurality of openings 60 across which extend screens 61 which permit liquid to flow through the plate 59 into the space beneath the plate and between the diaphragm 23 and the cylindrical element 58. The outer edge of the flange 59 is provided with upwardly extending curved blades 62 which are preferably struck up from the metal and which are formed in such a way as to direct the liquid inwardly away from the outer edge of flange 59 to the opening in the cylindrical element 58 thereby preventing the liquid, which may carry particles of iron or other magnetic material which may be deposited, from reaching the space between the periphery of the rotatable armature and diaphragm 23. A similar rotatable element 571 is secured to the rotor beneath the armature and as the element operates and prevents deposit of magnetic material in the same manner as element 57 it need not further be described.

Figure 4:
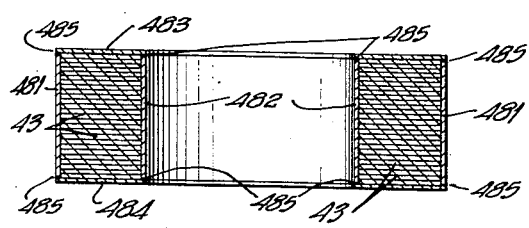
Fig. 4 illustrates a modification of our invention in which the laminations and conductors (not illustrated) are enclosed in a casing.

In the embodiment of our invention illustrated in Fig. 4, the laminations 48 of the rotor of the motor are enclosed in a casing formed by surrounding the laminations not only by a sleeve 481 formed of or coated with a non-corrosive material as in Fig. 1 but also by a shell 482 disposed within the laminations and annular plates 483 and 484 located, respectively, above and below the laminations and are either formed of or coated with non-corrosive material and soldered at their edges, as at 485 to form a sealed casing for the laminations of the rotor.

Figure 5:
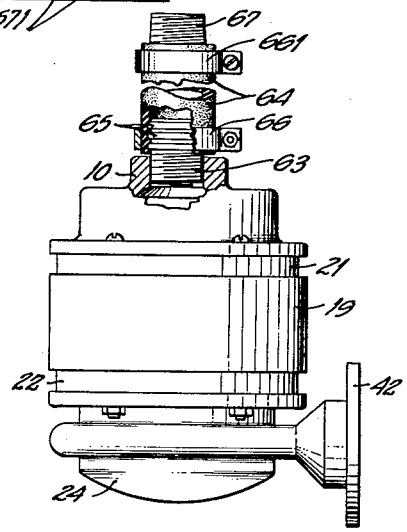
Fig. 5 is a front view illustrating means for preventing vibrations from being transmitted from an alternating current electric motor to adjacent circulating pipes.

In Fig. 5 we have illustrated a preferred form of connection between the combined pump and motor and the pipe to which it is connected. When a metal circulating pipe is connected directly to an alternating current motor, the latter, at times, sets up a vibration which is transmitted to the pipe and creates a disturbing hum. In the embodiment of our invention illustrated in Fig. 4, a pipe connection 63 is threaded into the threaded opening of the upper end frame 10 and a tube 64 formed of rubber or other flexible material, is preferably threaded at its lower inner portion as at 65 to engage the threads of the pipe 63. Then when a clamping ring 66 is secured about the lower end of the rubber tube 64 a fluid tight joint is provided. Similarly a clamping ring 661 clamps the upper end of the tubular element 64 to the pipe coupling 67 which may conveniently be coupled to a circulating pipe. In the foregoing construction, the rubber or other flexible material which is interposed between the motor and the pipe line, overcomes any tendency of the vibrations of the motor to be transmitted to the pipe line.

While we have described our invention in its preferred embodiment, it is to be understood that the words which we have used are words of description and not of limitation and that changes within the purview of the appended claims may be made without departing from the true scope and spirit of our invention in its broader aspects.

What we claim is:

1. In a combined pump and electric motor, means comprising a hollow diaphragm formed of non-magnetic material defining a passage for the flow of liquid, an electric motor comprising a stationary field surrounding said diaphragm and a rotatable armature disposed within said diaphragm, and associated means for excluding particles of magnetic material carried by said liquid from the space between said armature and said diaphragm.

2. In a combined pump and electric motor, means comprising a hollow diaphragm formed of non-magnetic material defining a passage for the flow of liquid, an electric motor comprising a stationary field surrounding said diaphragm and a rotatable armature disposed within said diaphragm, and overlapping baffle elements attached to said diaphragm and to said armature, respectively, for excluding particles of magnetic material carried by said fluid from the space between said armature and said diaphragm.

3. In a combined pump and electric motor the axis of which is vertically disposed, a motor shaft substantially concentric with said axis, the armature of said motor being attached to said shaft, means defining a passage for the flow of liquid through said motor and comprising a diaphragm surrounding said armature, a stationary field surrounding said diaphragm, means attached to said shaft for propelling liquid through said motor, and baffle elements attached to said armature and to said diaphragm, respectively, for excluding magnetic particles carried by said liquid from the space between said armature and said diaphragm.

4. In a combined pump and electric motor, means comprising a hollow diaphragm formed of non-magnetic material defining a passage for the flow of liquid, an electric motor comprising a stationary field surrounding said diaphragm and a rotatable armature disposed within said diaphragm, and overlapping baffle elements attached to said diaphragm and to said armature, respectively, for excluding particles of magnetic material carried by said fluid from the space between said armature and said diaphragm, the deposit taking place on the rotatable element of said baffle.

5. In a device of the character described, a motor comprising a stator and a rotor, means defining a passage for the flow of liquid through said motor, and a baffle comprising overlapping baffle elements attached to said motor and to said stator, respectively, for preventing the flow of magnetic particles deposited from the liquid from depositing between said rotor and said stator.

6. In a device of the character described, a motor comprising a stator and a rotor, means defining a passage for the flow of liquid through said motor, and a baffle comprising overlapping baffle elements attached to said motor and to said stator, respectively, the space between said baffles which furnishes communication between the body of water flowing through said motor and the space between said rotor and said stator leading from a magnetic field of a given intensity to a magnetic field of less intensity.

7. In a device of the character described, a motor comprising a stator and a rotor, means defining a passage for the flow of liquid through said motor, and a baffle comprising overlapping baffle elements attached to said rotor and to said stator, respectively, the magnetic field of said stator tending to attract magnetic particles from the pumped liquid and cause them to deposit between said rotor and said stator, respectively, and defining a space therebetween leading from a magnetic field of a given intensity to a less intense magnetic field in order to reach the space between said rotor and said stator.

8. In a combined pump and electric motor, means comprising a diaphragm formed of non-magnetic material defining a passage through which liquid may flow, said motor comprising a rotor disposed within said diaphragm and a stator which tends to attract magnetic particles which may be carried by said liquid disposed outside of said diaphragm, and a plate rotatable by said rotor and extending transversely of the passage for said liquid and with its periphery adjacent to the walls of said passage, said plate being provided with a screened opening and the margin of said plate being provided with means for forcing liquid inwardly from the periphery of said plate.

9. In a combined pump and electric motor, means comprising a diaphragm formed of non-magnetic material defining a passage through which liquid may flow, said motor comprising a rotor disposed within said diaphragm and a stator which tends to attract magnetic particles which may be carried by said liquid disposed outside of said diaphragm, and a plate rotatable by said rotor and extending transversely of the passage for said liquid and with its periphery adjacent to the walls of said passage, said plate being provided with a screened opening and the margin of said plate being provided with blades extending away from said plate and shaped to direct liquid inwardly away from the margin of said plate.

CLAUDE G. BORDEAUX.
FORREST S. WHITE.